(12) United States Patent
Bogner et al.

(10) Patent No.: US 8,176,149 B2
(45) Date of Patent: May 8, 2012

(54) EJECTION OF STORAGE DRIVES IN A COMPUTING NETWORK

(75) Inventors: Matthew Bogner, Austin, TX (US); Sumant Padbidri, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 134 days.

(21) Appl. No.: 12/165,104

(22) Filed: Jun. 30, 2008

(65) Prior Publication Data

US 2009/0328083 A1    Dec. 31, 2009

(51) Int. Cl.
*G06F 15/177* (2006.01)
(52) U.S. Cl. .............................. 709/220; 715/734; 710/8
(58) Field of Classification Search ............... 369/30.32; 709/220, 221, 223, 224, 225, 226; 715/734, 715/835, 966, 969; 720/636; 710/5, 8, 36
See application file for complete search history.

(56) References Cited

U.S. PATENT DOCUMENTS

| | | | |
|---|---|---|---|
| 6,125,428 A * | 9/2000 | Miyazaki et al. ............. | 711/112 |
| 6,618,254 B2 * | 9/2003 | Ives ............................... | 361/726 |
| 2003/0037247 A1 * | 2/2003 | Obara et al. ................... | 713/193 |
| 2003/0191752 A1 * | 10/2003 | Fairweather .................... | 707/3 |
| 2004/0141446 A1 * | 7/2004 | Kamon ....................... | 369/53.36 |
| 2005/0030721 A1 * | 2/2005 | Shimada et al. .............. | 361/726 |
| 2005/0262400 A1 * | 11/2005 | Nadeau et al. ................. | 714/42 |
| 2006/0002256 A1 * | 1/2006 | Kamio ......................... | 369/47.1 |
| 2006/0007576 A1 * | 1/2006 | Georgis ......................... | 360/69 |
| 2007/0255920 A1 * | 11/2007 | Gold ............................. | 711/170 |
| 2009/0113129 A1 * | 4/2009 | Deicke et al. ................. | 711/115 |

FOREIGN PATENT DOCUMENTS

| | | | |
|---|---|---|---|
| JP | 10-301719 | * | 11/1998 |
| JP | 10301719 A | * | 11/1998 |

* cited by examiner

*Primary Examiner* — Tan X Dinh
(74) *Attorney, Agent, or Firm* — Century IP Group, Inc.; F. Jason Far-hadian, Esq.

(57) ABSTRACT

A method for managing a storage system comprises ejecting a first drive in the storage system having a plurality of drives, in response to determining a fault associated with the first drive, wherein the ejecting takes place in response to a command issued by a management tool utilized for determining the fault associated with the plurality of drives in the storage system.

13 Claims, 5 Drawing Sheets

EJECTION OF STORAGE DRIVES IN A COMPUTING NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to storage systems and, more particularly, to a system and method for managing the ejection of disk drives in a storage system.

BACKGROUND

In a data center, several storage systems, each having a plurality of disk drives, are connected in a communication network. The storage system is managed typically by an administrator who monitors and maintains the integrity of the storage system by attending to problems that arise from time to time.

For example, when a disk drive in a storage system or subsystem fails, the administrator will attempt to determine and correct the problem. A failure in some systems is identified by way of a status indicator light (e.g., LED) that changes color, for example, from green to amber on the faulty drive. In some storage systems, a software-based indicator may be also implemented to alert the system administrator by displaying a notification on a user interface device, such as a computer monitor.

Both of the above alert mechanisms are inadequate solutions in data centers with a large number of drives. An LED indicator can pose a problem for a color-blind person who cannot distinguish the difference in color variations. And, the software-based indicator typically does not provide an administrator with sufficient information to physically and quickly locate a target drive, making the task of identifying a particular drive among a great plurality of drives in the event of a failure quite difficult.

As such, finding one or more drives in a data center with multitudes of storage systems and subsystem may be a daunting task. Methods and systems are needed that can overcome the aforementioned shortcomings.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for managing a storage system comprises ejecting a first drive in the storage system having a plurality of drives, in response to determining a first state associated with the first drive, wherein the ejecting takes place in response to a command issued by a management tool utilized for determining the state associated with a plurality of drives in the storage system. The first drive may be held in a casing and the ejecting may result in the first drive protruding from the casing to an extent such that the first drive is ubiquitously noticeable.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
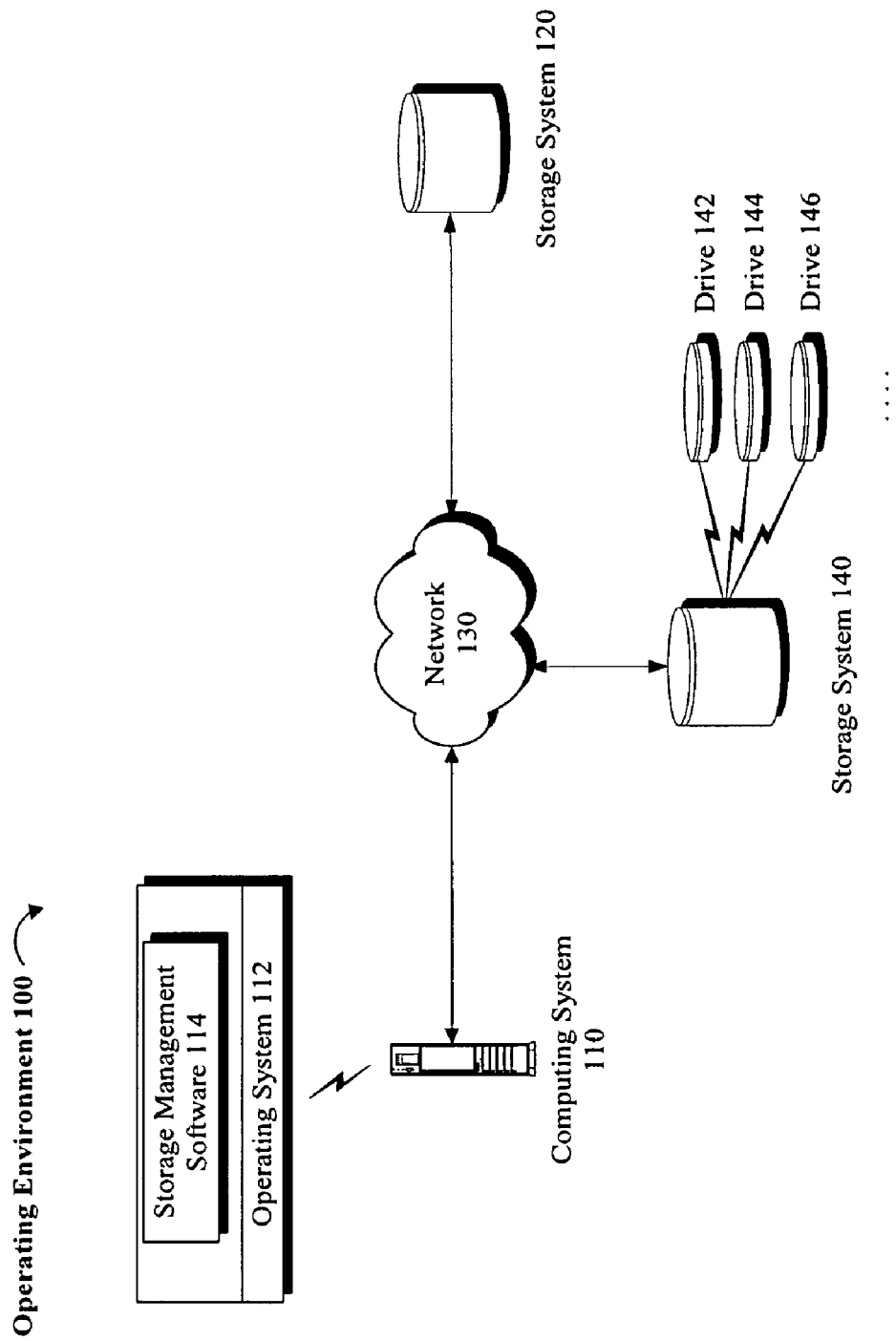
FIG. 1 illustrates an exemplary operating environment in accordance with one or more embodiments, wherein a plurality of drives in one or more storage systems may be managed in a communications network.

Referring to FIG. 1, an exemplary operating environment 100 is illustrated. Operating environment 100 comprises a computing system 110 connected to one or more storage systems or subsystems 120, 140 over a communications network 130. Each storage system 120, 140 may have one or more drives 142, 144, 146. Each drive may be utilized to house a storage medium such as a hard disk drive, an optical drive, a flash drive or other type of storage medium suitable for data storage and use in a computing environment.

Computing system 110 may be implemented as a storage server that is either locally or remotely connected to one or more storage area networks (SANs) comprising one or more storage systems or subsystems 120, 140. Storage management software 114 may be executed on top of an operating system 112 running on computing system 110. Storage management software 114 may be configured, in certain embodiments, to monitor and detect data storage faults or other problems, states or conditions associated with a storage medium or drive in storage systems 120, 140.

Figure 2:
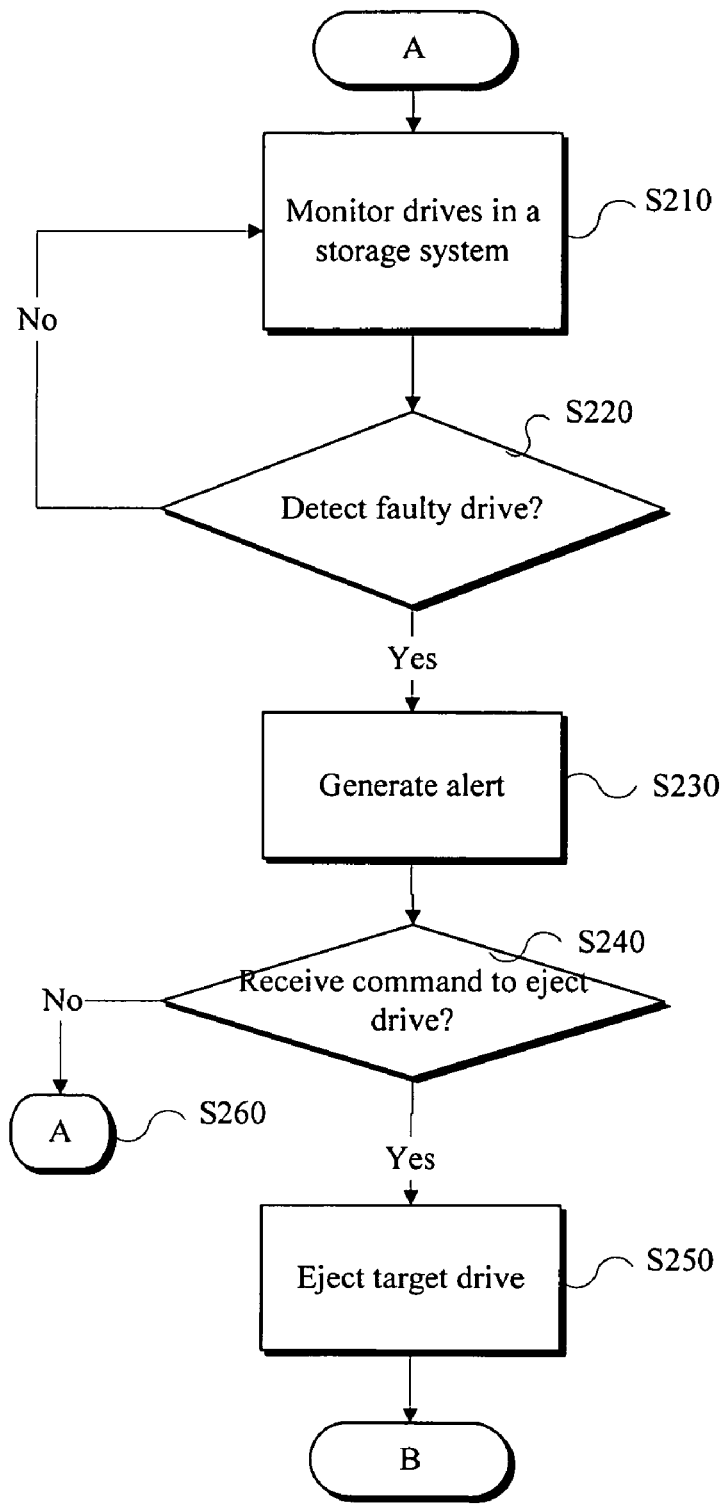
FIG. 2 is a flow diagram of a method for ejecting a drive, in accordance with one embodiment.

Referring to FIGS. 1 and 2, for example, in one embodiment, storage management software 114 monitors a plurality of drives (e.g., drives 142, 144, 146, etc.) in storage system 140 (S210). If a faulty drive is detected (S220), then an alert is generated (S230). A fault may be detected in a drive as a result of a drive malfunctioning either physically (e.g., a fault in the respective hardware components) or as a result of the storage medium housed in the drive or the data stored there on being corrupted. Depending on implementation, an alert may be generated by way of a sensory display on a computer monitor, speaker or other output device.

In response to generation of the alert associated with a drive 142, for example, a system administrator may investigate and determine that the drive 142 needs to be replaced. If so, the system administrator may interact with a user interface to issue a command for drive 142 to be ejected. In response to receiving the command to eject a drive (S240), storage management software 114 causes the target drive (e.g., drive 142) in a target storage system (e.g., storage system 140) to be ejected (S250).

It is noteworthy that while certain embodiments are disclosed herein as applicable to a scenario in which a faulty drive is detected and ejected, the concepts and features provided here are also applicable in a scenario that a non-faulty drive may be targeted and ejected for any reason. For example, a system administrator may configure storage management software 114 to generate an alert or eject one or more drives 142, 144, 146 when a certain condition is met or when a drive is detected to be in a certain state (e.g., when a drive is full beyond a predetermined threshold, or when a drive is determined to be critical to an important operation).

Referring back to FIG. 2, in certain embodiments, in response to detecting a faulty drive (S220) an alert may not be generated. That is, once a faulty drive is detected (or when a certain condition or state associated with a drive is determined), process S230 may be skipped and a signal may be automatically generated by storage management software 114 to eject one or more target drives (S250). Accordingly, storage management software 114 may be customized or configured to either generate an alert and eject a target drive in response to direct user interaction, or alternatively eject a target drive automatically, without any user interaction.

Figure 3:
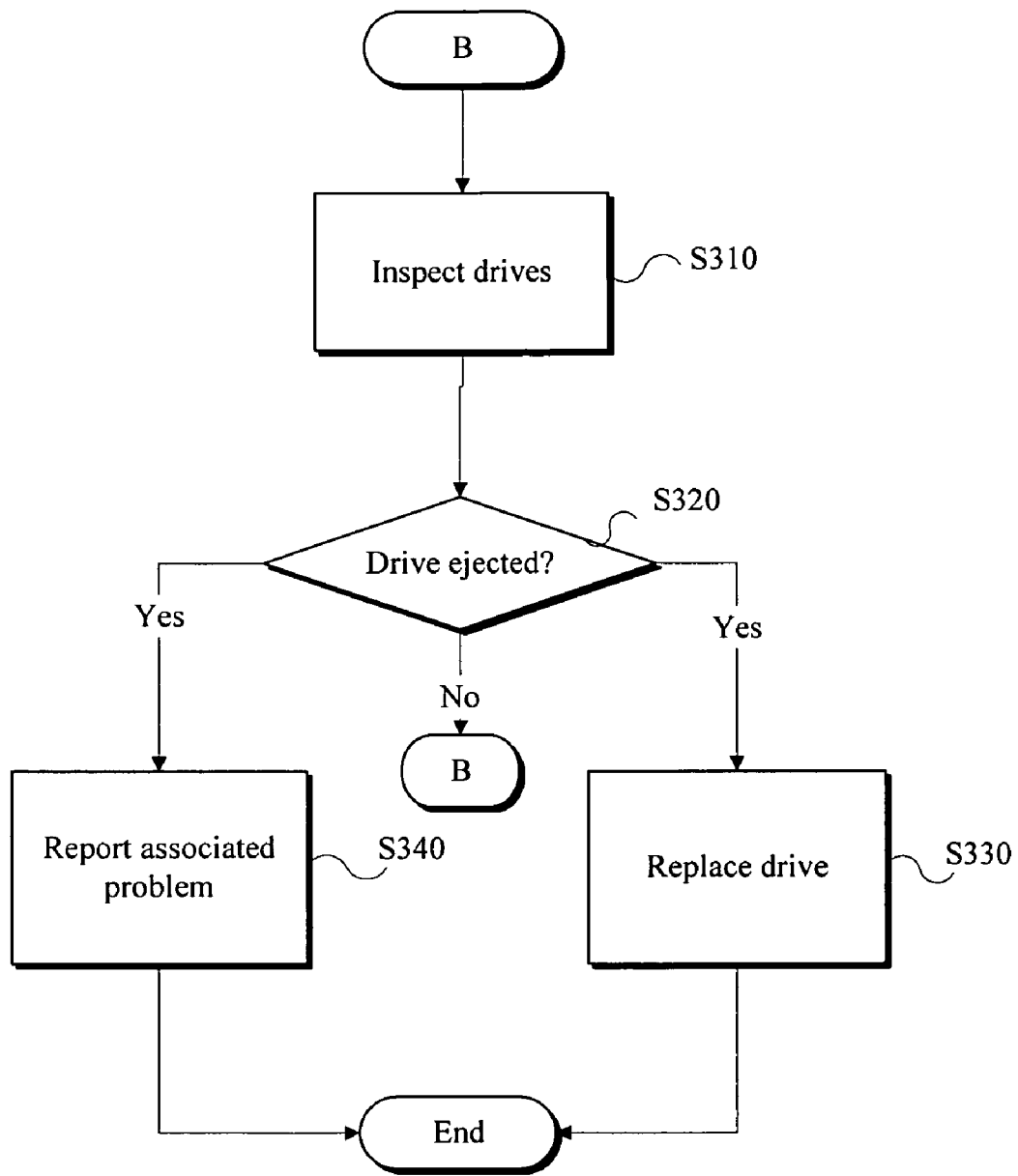
FIG. 3 is a flow diagram of a method of processing an ejected drive, in accordance with one embodiment.

Referring to FIG. 3, a system administrator may utilize storage management software 114 to remotely monitor multitudes of drives in several locally or remotely connected storage systems 120, 140 from a central location. Either the system administrator, or more advantageously a less skilled individual, may detect the ejected (e.g., faulty) drives by simply inspecting the drives (S310). Depending on implementation, a drive 142 may be ejected from a casing that houses drive 142 to an extent that a visual inspection would alert a person that the drive has been ejected. Thus, in one embodiment, a person would not rely on illumination units (e.g., LEDs) on the drive or a displayed alert on a computer monitor to locate the target drive.

If the inspection results in finding an ejected drive (S320), then the system administrator or other human operator may replace the drive (S330) or at least report a problem associated with the ejected drive (S340). The above exemplary implementations are provided to illustrate possible scenarios that may be encountered during managing storage systems in a data center, but are not meant to be inclusive in any way. One would appreciate that the concepts and implementations disclosed above may be applicable in a variety of other scenarios without limitation or detracting from the intended scope of the invention.

In different embodiments, the invention can be implemented either entirely in the form of hardware or entirely in the form of software, or a combination of both hardware and software elements. For example, computing system 110, storage systems 120, 140 and storage management software 114 may comprise controlled computing system environments that can be presented largely in terms of hardware components and software code executed to perform processes that achieve the results contemplated by the system of the present invention.

Figure 4:
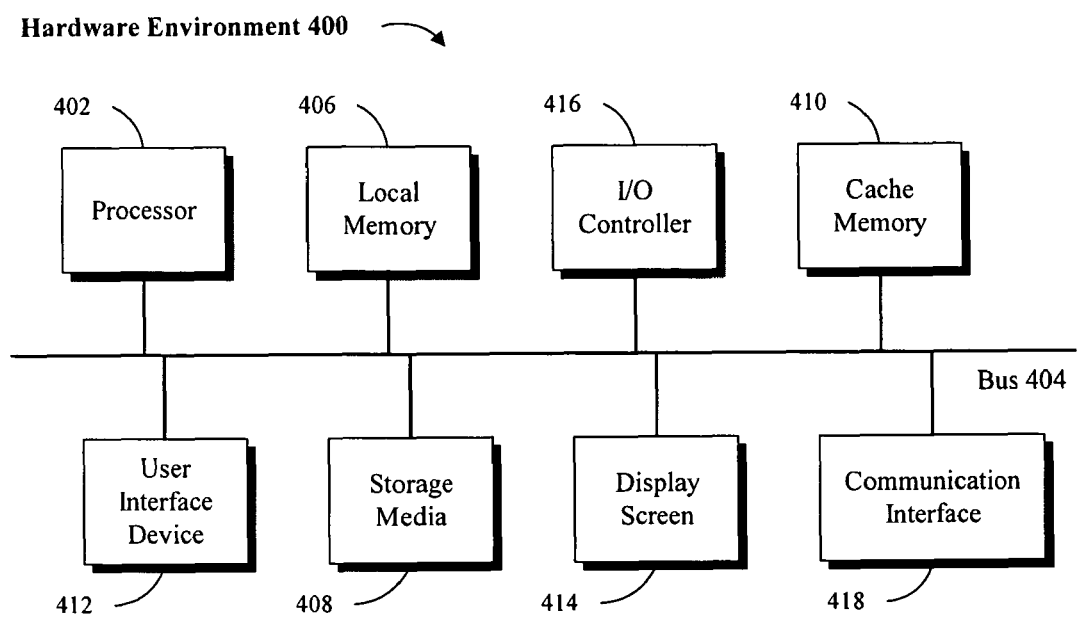
FIGS. 4 and 5 are block diagrams of hardware and software environments in which a system of the present invention may operate, in accordance with one or more embodiments.
Figure 5:
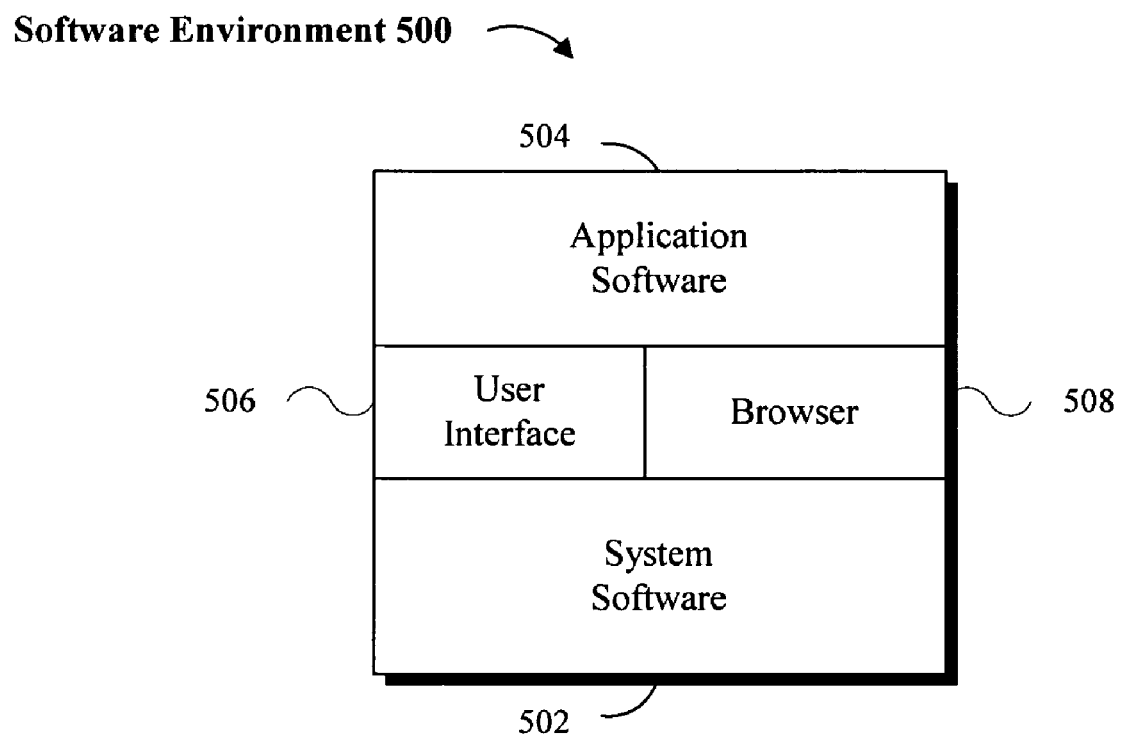

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, storage management software 114 may be implemented as system software 502 and application software 504 executed on one or more hardware environments to facilitate the management of a storage system. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:
   in a computing network in which a primary computing system is remotely connected to a plurality of drives in a storage system, remotely monitoring, using storage management software executed on the primary computing system, the plurality of drives in the storage system to determine a failed state condition associated with a first drive from among said plurality of drives prior to the first drive being ejected from its casing, wherein the plurality of drives are located along side each other in a data center in a plurality of rows, such that each row comprises multitudes of drives, so that from a first viewing distance and angle outside the plurality of rows, a visual inspection of plurality of illumination units associated with said multitudes of drives is insufficient to alert a human operator of a failed condition of a first drive when looking through said multitudes of drives from among said plurality of rows;
   after the storage management software has detected the failed state condition associated with the first drive, ejecting the first drive in the storage system, in response to the storage management software issuing an eject command without the interaction of the human operator, wherein the first drive is held in a casing and the ejecting results in a substantial length of the first drive protruding from the casing to an extent that the first drive is ubiquitously noticeable to the human operator from among said multitudes of drives and rows from the first viewing distance and angle without the human operator relying on status of the plurality of the illumination units to detect said failed condition or the human operator having to physically enter the row of disks in which the disk having the failed condition is positioned.

2. The method of claim 1, wherein the storage system comprises a storage area network and the storage management software is executed on a computing system that is connected to the storage system over a communications network.

3. The method of claim 2, wherein the storage management software is utilized to control ejection of a plurality of drives in the storage system from a central location.

4. The method of claim 3, wherein the central location is remotely connected to the storage system over the communication network and the substantial length of the first drive comprises more than half of the length of the first drive.

5. The method of claim 1, wherein the condition is determined in absence of direct human interaction with the management tool.

6. The method of claim 1, wherein the command issued by the storage management software is in response to direct human interaction with the storage management software.

7. The method of claim 1, wherein the first drive is a hard drive.

8. The method of claim 1, wherein the first drive is a flash drive.

9. The method of claim 1, wherein the first drive is an optical drive.

10. A storage system comprising:

a storage management unit in which a primary computing system is remotely connected to a plurality of drives in a storage system for remotely monitoring said plurality of drives in said storage system to determine a failed condition associated with a first drive from among said plurality of drives prior to the first drive being ejected from its casing, wherein the plurality of drives are located along side each other in a data center in a plurality of rows such that each row comprises multitudes of drives, so that from a first viewing distance and angle outside the plurality of rows, a visual inspection of plurality of illumination units associated with said multitudes of drives is insufficient to alert a human operator of a failed condition of a first drive when looking for a failed drive by looking through said multitudes of drives from among said plurality of rows;

an ejecting mechanism for ejecting the first drive in the storage system after the storage management software has detected the failed condition associated with the first drive, in response to the storage management software issuing an eject command without the interaction of the human operator, wherein the first drive is held in a casing and the ejecting results in a substantial length of the first drive protruding from the casing to an extent that the first drive is ubiquitously noticeable to the human operator from among said multitudes of drives and rows from the first viewing distance and angle without the human operator relying on status of the plurality of the illumination units to detect said failed condition or the human operator having to physically enter the row of disks in which the disk having the failed condition is positioned.

11. The storage system of claim 10, wherein the storage system comprises a storage area network and the storage management unit is implemented in software executed on a computing system that is connected to the storage system over a communications network.

12. The storage system of claim 11, wherein the storage management unit is utilized to control ejection of a plurality of drives in the storage system from a central location.

13. The method of claim 12, wherein the central location is remotely connected to the storage system over the communication network and the substantial length of the first drive comprises more than half of the length of the first drive.

* * * * *